United States Patent Office 3,084,099
Patented Apr. 2, 1963

3,084,099
THERAPEUTIC AMINE-RESIN COMPLEX COMPOSITION AND METHOD OF USING SAME
Edwin E. Hays and Bola Vithal Shetty, Rochester, N.Y., assignors to Wallace & Tiernan Inc., a corporation of Delaware
No Drawing. Filed Aug. 4, 1958, Ser. No. 753,093
2 Claims. (Cl. 167—55)

This invention relates to novel therapeutic compositions possessing superior appetite suppressive properties. The compositions of the present invention have also been found to have mood-elevating properties.

More particularly, the invention relates to pharmaceutical compositions having reduced side effects upon administration to patients, and having potent appetite suppressive properties.

It has been known heretofore that many alpha di-substituted ethane amines are active pharmaceutical compounds exhibiting vasopressor or vasodilator, mydriatic, sympathomimetic, and/or central stimulant properties in varying degrees. The compound alpha,alpha,dimethylphenethylamine and its preparations were first reported by Mentzer in Comptes Rendus 213–581 (1941). This compound has also been described in U.S. Patent 2,408,345 (1946). The present invention, however, is particularly concerned with the preparation of compositions of dosage-unit forms of certain resin complexes of alpha di-substituted ethane amines, or their equivalent therapeutically effective salts, for oral administration for the suppression of appetite.

The therapeutic compositions of the present invention may be prepared having the selected alpha di-substituted ethane amine, or salts, as resin complexes thereof as the predominant and primary active medicament, which is supported or suspended in a solid, substantially non-toxic pharmaceutical carrier such as lactose, starch, sugar and/or dextrin, together with other inert excipients commonly used in the preparation of tablets, such as stearic acid, magnesium stearate, gelatin and/or acacia. The dosage of active medicament in each tablet of a dosage-unit form of the therapeutic composition may range from 2 milligrams of the beta-phenyl-alpha-alpha-dimethyl-alpha-amino-ethane (or its salts) to 150 milligrams of the therapeutically active beta-phenyl-alpha-alpha-dimethyl-alpha-amino-ethane (or salts thereof), as resin complexes of such compound. Preferably, the dosage units will range from 15 to 60 milligrams.

The alpha di-substituted ethane amines which constitute the active medicaments in the novel dosage-unit forms comprising the invention are represented by the following general formula:

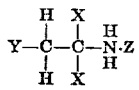

wherein Y represents phenyl or a saturated five or six membered ring, X represents lower alkyl, aralkyl, and aryl; and pharmacologically acceptable acid addition salts thereof; and when taken together with Z represents a sulphonic acid cation exchange resin forming a resin complex with the base. The invention thus contemplates and includes compositions comprising the above compounds when absorbed upon or ionically bound with a sulphonic acid cation exchange resin in dosage form which produces a long acting effect for a period of at least 8 to 12 hours as appetite suppressants. The invention also includes novel methods for the preparation of such resin complexes.

It has been found that the best results have been obtained by the use of the resin complexes for obtaining a prolonged and sustained activity without the undesirable side effects.

Although there are set forth below certain specific examples of the invention and its application in practical use, along with certain modifications and alternatives, it should be understood that these are not intended to be exhaustive or limiting of the invention. On the contrary, the specific examples are set forth as illustrations to fully acquaint others skilled in the art with the invention and principles thereof and a suitable manner of its application in practical use, so that they may be enabled to modify the invention and to adapt and apply it in numerous forms.

EXAMPLE I

Preparation of 1-Benzyl Isopropylamine Resin Complex

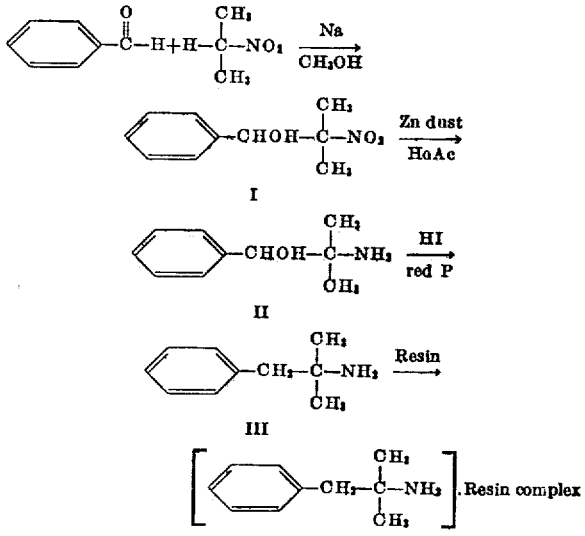

A. PREPARATION OF 1-PHENYL-2-METHYL-2-NITROPROPANOL

Seventy grams (3.1 gram atoms) of sodium was dissolved in 5300 cc. of anhydrous methanol. 1420.0 grams (15.9 moles) of 2-nitropropane and 1611.0 grams (15.1 moles) of benzaldehyde were added. The mixture was allowed to stand at room temperature for 24 hours. The reaction mixture was acidified with 1500 cc. of acetic acid and the methanol was distilled off under reduced pressure. The residue was dissolved in a mixture of 3 liters of ether and 3 liters of water. The ether was washed with water, 4 times with 1500 cc. of 15% sodium bisulfite and again with water. After drying, the ether was distilled off and the residue was heated at 100° C. under vacuum for a short time. The residue was stirred with 4 liters of ligroin in an ice bath for 1–2 hours and the solid was removed by filtration, washed and dried. The crude product was recrystallized from 2 liters of heptane to give a white solid. M.P.—68–70° C. Yield—397 grams (12.8%).

B. PREPARATION OF 1-PHENYL-2-METHYL-2-AMINOPROPANOL

Three hundred and ninety-seven grams (2.04 moles) of 1-phenyl-2-methyl-2-nitropropanol was dissolved in 1500 cc. of ethanol. 1650 cc. of acetic acid and 2050 cc. of water were added. Then 800 grams of zinc dust was added during a period of ½ hour at such a rate that the reaction temperature stayed approximately 70° C. After the addition was completed, the reaction mixture was kept at 60–70° C. for 5½ hours, diluted with 4300 cc. of water and filtered. The filtrate was washed with ether and the aqueous fraction was made alkaline with 6400 cc. of 40% sodium hydroxide solution. The solution was extracted with ether. The ether was washed with 40% sodium hydroxide solution, followed by water, dried and the ether distilled off. The residue was recrystallized from 3500 cc. of heptane to give a white solid. M.P.— 96–99. Yield—157 grams (46.5%).

C. PREPARATION OF 1-BENZYL-ISOPROPYLAMINE

One hundred and twenty-four grams (0.75 mole) of 1-phenyl-2-methyl-2-aminopropanol was dissolved in 320 cc. of 57% hydriodic acid and 38.0 grams of red phosphorous was added. It was stirred and refluxed for 25 hours. The reaction mixture was cooled and 1400 cc. of water was added. It was filtered and then a small amount of sodium thiosulfate was added. The solution was made alkaline with 200 cc. of 40% sodium hydroxide solution and extracted with ether. The combined extracts were washed with water, dried, and the ether was distilled off. The residue was distilled in vacuo at 0.3–0.5 mm. to give a colorless liquid. B.P.—52–54° C./0.3–0.5 mm. Yield.—73 grams (66%).

D. PREPARATION OF RESIN COMPLEX

Two hundred and ten grams of Duolite C-20 resin (a copolymer polystyrene type resin with a nuclear sulfonic acid functional group) was soaked for 20 minutes with stirring in 1800 cc. of deionized water. To this slurry 90 grams (0.60 mole) of 1-benzyl isopropylamine was added and the reaction mass stirred for 5 hours.

Upon completion of the reaction period, the slurry was allowed to settle and the suspension medium removed by decantation. The resin was again suspended in 1800 ml. of deionized water, stirred for 15 minutes and allowed to settle for decantation. This was repeated twice more to insure thorough washing, the final wash being used to transfer the resin to a Büchner funnel for drying. The resin was oven dried at 60° C. for 14 hours, weighed, and assayed.

The dry weight of the resin complex was 276.3 grams. The assay was done by standard Kjeldahl total nitrogen procedure and determined to be 28.9% 1-benzyl isopropylamine or 0.54 mole reacted.

EXAMPLE II

*Preparation of 1-Benzyl-Isopropylamine Resin Complex*

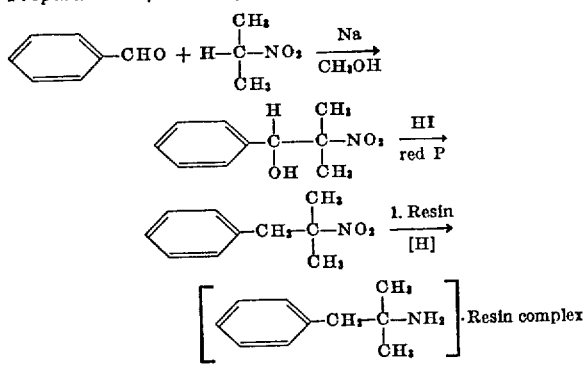

A. PREPARATION OF 1-PHENYL-2-METHYL-2-NITRO-PROPANOL

Seventy grams (3.1 gram atoms) of sodium was dissolved in 5300 cc. of anhydrous methanol. 1420.0 grams (15.9 moles) of 2-nitropropane and 1611.0 grams (15.1 moles) of benzaldehyde were added. The mixture was allowed to stand at room temperature for 24 hours. The reaction mixture was acidified with 1500 cc. of acetic acid and the methanol was distilled off under reduced pressure. The residue was dissolved in a mixture of 3 liters of ether and 3 liters of water. The ether was washed with water, 4 times with 1500 cc. of 15% sodium bisulfite and again with water. After drying, the ether was distilled off and the residue was heated at 100° C. under vacuum for a short time. Then the residue was stirred with four liters of ligroin in an ice bath for 1–2 hours and the solid was removed by filtration, washed and dried. The crude product was recrystallized from 2 liters of heptane to M.P. 68–70° C.

B. PREPARATION OF 1-PHENYL-1-CHLORO-2-METHYL-2-NITROPROPANE

Twenty grams (0.102 mole) of 1-phenyl-2-methyl-2-nitropropanol was treated with an excess of thionyl chloride and one gram of anhydrous calcium chloride. Then it was heated on a steam bath for 2 hours under dry conditions. After standing overnight at room temperature, it was filtered and the residue was washed with anhydrous ether. From the combined filtrates, the ether and the excess of thionyl chloride were removed using an aspirator. The residue was distilled in vacuo at 110° C./0.5 mm.

C. PREPARATION OF 1-BENZYL-ISOPROPYLAMINE RESIN COMPLEX

Dissolve 1-phenyl-1-chloro-2-methyl-2-nitropropane in absolute methanol, add the resin, the catalyst and hydrogenate. Filter and transfer the reaction mixture to sieve No. 60. Wash with cold water and dry.

EXAMPLE III

*Preparation of 1-Benzyl-Isopropylamine Resin Complex*

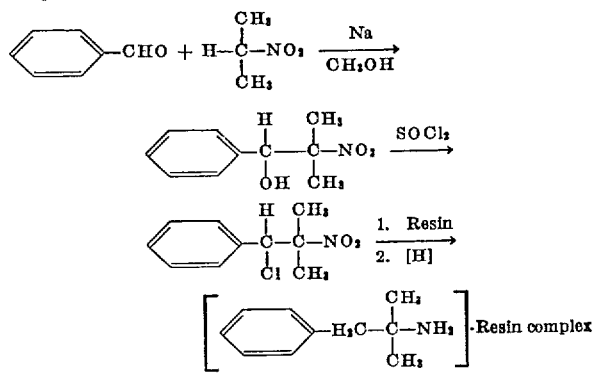

A. PREPARATION OF 1-PHENYL-2-METHYL-2-NITROPROPANOL

Seventy grams (3.1 gram atoms) of sodium was dissolved in 5300 cc. of anhydrous methanol. 1420.0 grams (15.9 moles) of 2-nitropropane and 1611.0 grams (15.1 moles) of benzaldehyde were added. The mixture was allowed to stand at room temperature for 24 hours. The reaction mixture was acidified with 1500 cc. of acetic acid and the methanol was distilled off under reduced pressure. The residue was dissolved in a mixture of 3 liters of ether and 3 liters of water. The ether was washed with water, 4 times with 1500 cc. of 15% sodium bisulfite and again with water. After drying, the ether was distilled off and the residue was heated at 100° C. under vacuum for a short time. Then the residue was stirred with four liters of ligroin in an ice bath for 1–2 hours and the solid was removed by filtration, washed and dried. The crude product was recrystallized from 2 liters of heptane to M.P. 68–70° C.

B. PREPARATION OF 2-NITRO-2,2-DIMETHYL-1-PHENYLETHANE

In a 500 cc. round bottomed flask, equipped with a stirrer and a reflux condenser, were placed 14.6 grams (0.075 mole) of 1-phenyl-2-methyl-2-nitropropanol, 32 cc. of 57% hydriodic acid and 3.8 grams of red phosphorous. The mixture was stirred and refluxed for 25 hours. The reaction mixture was cooled and mixed with water. It was treated with sodium thiosulfate followed by sodium hydroxide solution. It was extracted with ether, dried over anhydrous sodium sulfate and filtered. From the filtrate, the ether was removed and the product was purified.

C. PREPARATION OF 1-BENZYL-ISOPROPYLAMINE RESIN COMPLEX

Dissolve 2-nitro-2,2-dimethyl-1-phenylethane in absolute methanol, add the resin, the catalyst and hydrogenate. Filter and transfer the reaction mixture to sieve No. 60. Wash with cold water and dry.

EXAMPLE IV

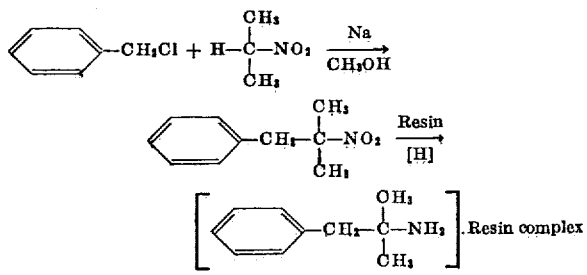

A. PREPARATION OF 2-NITRO-2,2-DIMETHYL-1-PHENYLETHANE

Thirty-four grams of sodium was dissolved in 3000 cc. of absolute methanol. Then 650.0 grams of 2-nitropropane and 190.0 grams of benzyl chloride were added. It was refluxed for 8 hours. The reaction mixture was cooled and filtered. From the filtrate, the solvent was removed and the residue was distilled in vacuo.

B. PREPARATION OF 1-BENZYL-ISOPROPYLAMINE RESIN COMPLEX 2-nitro-2,2-dimethyl-1-phenylethane was dissolved in absolute methanol, and the resin and the catalyst were added and hydrogenated. The reaction mixture was filtered and transferred to sieve No. 60. It was then washed with cold water and dried.

EXAMPLE V

*Preparation of Beta-Phenyl-Alpha-Amino-Alpha-Alpha-Dimethyl Ethane*

Fifteen parts of the above beta-phenyl-beta-chloro-alpha-amino-alpha-alpha-dimethyl ethane hydrochloride were dissolved in 150 parts of alcohol, and 5 parts of palladinized calcium carbonate added. The mixture was then reduced in a conventional hydrogenation apparatus with hydrogen at 50–80° C. and under 50 lbs. pressure. When hydrogen was no longer readily absorbed, the solution was removed, the palladinized calcium carbonate filtered and the filtrate evaporated. The residue was dissolved in dilute hydrochloric acid, shaken with ether and the ether discarded. The acid solution was then made alkaline, as with sodium hydroxide, and the amine extracted with ether. The ether solution could (1) be dried and distilled to give the desired α-benzyl isopropyl amine, B.P. 205° at 750 mm. or 100° at 21 mm., or (2) the ether solution could be dried and saturated with hydrogen chloride and the precipitated hydrochloride recrystallized from a mixture of 50 parts alcohol and 100 parts acetone. The pure hydrochloride was thus obtained as a white crystalline substance in yields of 60% of the theoretical and having a M.P. of 195–196° C. unc.

Other halogeno compounds could be used instead of the chloro compound.

Instead of palladinized calcium carbonate other hydrogenation catalysts may be used. Palladium and/or platinum absorbed on a basic carrier such as an alkaline earth oxide or carbonate (especially calcium or magnesium) gives the best yield of the substituted phenyl-ethane. Platinum and platinum oxide (Adams), alone, palladium on charcoal, and Raney nickel may also be employed, but the yield of the beta-phenyl-alpha-alpha, dimethyl-alpha-amino ethane compound is a smaller portion of the total product, while at the same time there is produced a substantial yield of the novel product, beta-cyclohexyl-alpha-alpha-dimethyl-alpha-amino ethane. By substituting other starting materials, other cyclo groups, such as cyclopentyl, may be obtained.

Accordingly, regardless of which of two types of catalysts is employed, the method is utilizable for the production of a beta-cyclo-alpha-dimethyl-amino ethane, a catalyst of the former type being chosen when the "cyclo" radical is to be kept as an unsaturated nucleus and the latter type being suitable when it is desired to saturate the ring.

The solution during hydrogenation should not be sufficiently alkaline to remove the hydrochloric acid from the amine group as that would permit the amino-ethane compound to react with itself.

As generally recognized with this class of amines, they may be used either as free amines or as amine salts and as primary or secondary amines.

The following examples illustrate the novel compositions of the invention in solid form.

EXAMPLE VI

*Tablet of 1-Benzyl-Isopropylamine HCl*

| Per Tablet, milligrams | Formula | Per 10,000, grams |
|---|---|---|
| 10 | 1 benzyl isopropylamine HCl | 100 |
| 147 | Lactose, U.S.P. | 1,470 |
| 28 | Starch, U.S.P. | 280 |
| 7 | Sucrose—as 10% paste | 70 |
| 7 | Starch—as 10% paste | 70 |
| 1 | Magnesium Stearate | 10 |

Tablet weight—200 mg.
Tablet size—7/32".

The dried powders are weighed, screened, and mixed. The mixture is granulated with the sucrose-starch paste, then sized through a No. 8 screen and dried at 40° C. The dried granules are rescreened through a No. 14 screen and the lubricant is added. After final mixing, the tablets are compressed to approximate gauge and hardness.

EXAMPLE VII

*Tablet of 1-Benzyl-Isopropylamine Base*

| Per Tablet, milligrams | Formula | Per 10,000, grams |
|---|---|---|
| 10 | 1 benzyl isopropylamine Base | 100 |
| 200 | Starch, U.S.P. | 2,000 |
| 125 | Lactose | 1,250 |
| 7.5 | Polyvinylpyrolidone (as 25% solution) | 75 |
| 1.5 | Magnesium stearate | 15 |

Tablet weight—336.5 mg.
Tablet size—5/16".

The 1 benzyl isopropylamine base is absorbed on the starch by thorough mixing. The lactose is added and mixed. The mixture is granulated with polyvinylpyrolidone solution; sized through a No. 10 screen and dried at 40° C. The dried granules are sized through a No. 14 screen and the lubricant added. After final mixing, the tablets are compressed to approximate gauge and hardness.

EXAMPLE VIII

*Tablet of 1-Benzyl-Isopropylamine Resin Complex*

| Per Tablet, milligrams | Formula | Per 10,000, grams |
|---|---|---|
| 30 | 1 benzyl isopropylamine as Resin Complexes (25%) | 1,200 |
| 350 | Lactose | 3,500 |
| 300 | Starch | 3,000 |
| 10 | Polyvinylpyrolidone (as 25% solution) | 100 |
| 2 | Magnesium stearate | 20 |

Tablet weight—782 mg.
Tablet size—½".

The resin complex is mixed with the starch and lactose, and granulated with the polyvinylpyrolidone solution, then passed through a No. 8 screen and dried at 40° C. The dried granules are sized through a No. 12 screen and the lubricant added. After final mixing, the tablets are compressed to appropriate gauge and hardness.

EXAMPLE IX

*Capsules of 1-Benzyl-Isopropylamine HCl*

| Per Capsule, milligrams | Formula | Per 10,000, grams |
|---|---|---|
| 10 | 1 benzyl isopropylamine HCl | 100 |
| 3 | magnesium stearate | 30 |
| 287 | dicalcium phosphate dihydrate | 2,870 |

Capsule size—#3 2-piece gelatin.
Fill weight—300 mg.

The dried powders are thoroughly mixed, then filled into capsules.

EXAMPLE X

*Capsules of 1-Benzyl-Isopropylamine Base*

| Per Capsule, milligrams | Formula | Per 10,000, grams |
|---|---|---|
| 10 | 1 benzyl isopropylamine base | 100 |
| 200 | starch U.S.P. | 2,000 |
| 2.5 | polyvinylpyrolidone (as 25% solution) | 25 |
| 3.3 | magnesium stearate | |
| 121.2 | dicalcium phosphate dihydrate | |

Capsule size—#3 2-piece gelatin.
Fill weight—337 mg.

The 1 benzyl isopropylamine base is absorbed on the starch by thorough mixing. The starch is then granulated with the polyvinylpyrolidone solution, and after screening through a 20 mesh screen, is dried at room temperature in circulating air. The dried granules are then sized through a 60 mesh screen and mixed with the magnesium stearate and dicalcium phosphate. After thorough mixing, the powder is filled into capsules.

EXAMPLE XI

*Capsules of 1-Benzyl-Isopropylamine Resin Complex*

| Per Capsule, milligrams | Formula | Per 10,000, grams |
|---|---|---|
| 30 | 1 benzyl isopropylamine resin complex (25%) | 1,200 |
| 2.5 | magnesium stearate | 25 |
| 217.5 | dicalcium phosphate dihydrate | 2,175 |

Capsule size—#3 2-piece gelatin.
Fill weight—250 mg.

The components are thoroughly mixed, then filled into capsules.

Up to the present time the products of choice employed by the medical profession for the suppression of appetite have been alpha-methylphenethyl amine (Amphetamine), desoxy ephedrine, 3-methyl-2-phenylmorpholine (Preludin). While these compositions have been satisfactory for the purpose, it has now been found that the resin complexes of alpha di-substituted ethane amines and salts, particularly when employed in pharmaceutical compositions in dosage form, are far superior to the known therapeutic compositions presently in use.

The specific examples refer to the use of Duolite C–20 resin (a copolymer polystyrene type resin with a nuclear sulfonic acid functional group) as the cation exchange resin suitable for use in this invention. In addition to this resin, other sulfonic acid cation exchange resins may be employed.

The term "sulphonic acid cation exchange resin" is intended to include the phenol-sulphonic acid cation exchange resins and the carboxylic-sulphonic acid cation exchange resins. However, particularly satisfactory results have been obtained with the sulphonic acid cation exchange resins disclosed in the D'Alelio Patent No. 2,366,007, such resins being sulphonated polymerizates of polyvinyl aryl compounds. These are cross-linked resins. Other suitable cross-linked cation exchange resins are disclosed in U.S. Patents Nos. 2,204,539; 2,228,159; and 2,729,607. Such resins are as follows:

*IR–120.*—A water insoluble sulphonated polymerizate of polyvinyl aryl compound made in accordance with Example I of U.S. Patent 2,633,007, except that 7.5 parts by weight of divinyl benzene are used instead of 10 parts. The particle size is such that approximately 90% of the particles are retained on a 40 mesh screen, 5.67% on a 20 mesh screen, and 3.33% on a 60 mesh screen. The product can be considered as substantially consisting of a particle size of between 20 and 40 mesh. The cross-linkage is between 7 and 8%.

*XE–69.*—This is the same as IR–120, except that substantially all particles pass through an 80 mesh screen and are retained on a 400 mesh screen. In general, all of these resins have been fully identified in the literature.

What is claimed is:

1. A therapeutically effective appetite suppressing and mood elevating composition having reduced side effects, in dosage unit form, adapted for the treatment of obesity, comprising a pharmaceutical carrier and from 2 to 150 milligrams per dosage unit of a medicament having the formula

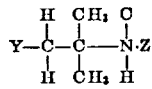

where Y represents a saturated carbocyclic five-membered ring and Z represents a sulfonic acid cation exchange resin forming a resin complex with the base.

2. The method of treating an obese patient to effect a suppression of appetite which comprises orally administering to said patient the composition of claim 1.

References Cited in the file of this patent

UNITED STATES PATENTS

| | | |
|---|---|---|
| 2,189,570 | Schechter | Feb. 6, 1940 |
| 2,408,345 | Shelton | Sept. 24, 1946 |
| 2,498,687 | Larsen | Feb. 28, 1950 |
| 2,673,223 | Wood | Mar. 23, 1954 |
| 2,673,827 | Kohlstaedt | Mar. 30, 1954 |
| 2,677,670 | Kunim | May 4, 1954 |
| 2,697,059 | Gustus | Dec. 14, 1954 |
| 2,794,786 | Segal | June 4, 1957 |
| 2,837,578 | Brown | June 3, 1958 |
| 2,990,332 | Keating | June 27, 1961 |

OTHER REFERENCES

Freed: Annals of Int. Med., vol. 44, 1956, pp. 1136–1141.

UNITED STATES PATENT OFFICE
CERTIFICATE OF CORRECTION

Patent No. 3,084,099                          April 2, 1963

Edwin E. Hays et al.

It is hereby certified that error appears in the above numbered patent requiring correction and that the said Letters Patent should read as corrected below.

Column 8, lines 39 to 43, the structural formula should appear as shown below instead of as in the patent:

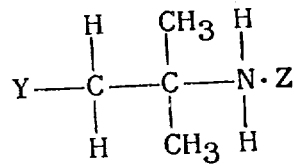

Signed and sealed this 29th day of October 1963.

(SEAL)
Attest:

ERNEST W. SWIDER
Attesting Officer

EDWIN L. REYNOLDS
Acting Commissioner of Patents